United States Patent
Lewis et al.

(10) Patent No.: US 10,499,265 B2
(45) Date of Patent: Dec. 3, 2019

(54) SYSTEM AND METHOD FOR "ALWAYS ON" OFFLINE TRANSACTION COLLECTION

(71) Applicant: Walmart Apollo, LLC, Bentonville, AR (US)

(72) Inventors: Steven Lewis, Bentonville, AR (US); Matthew Biermann, Fayetteville, AR (US); Suman Pattnaik, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/281,717

(22) Filed: Feb. 21, 2019

(65) Prior Publication Data

US 2019/0182688 A1   Jun. 13, 2019

Related U.S. Application Data

(63) Continuation of application No. 15/918,353, filed on Mar. 12, 2018, now Pat. No. 10,257,724.

(60) Provisional application No. 62/470,001, filed on Mar. 10, 2017.

(51) Int. Cl.
*H04W 24/04* (2009.01)
*H04L 12/26* (2006.01)
*H04W 84/18* (2009.01)

(52) U.S. Cl.
CPC ......... *H04W 24/04* (2013.01); *H04L 43/0882* (2013.01); *H04L 43/16* (2013.01); *H04W 84/18* (2013.01)

(58) Field of Classification Search
CPC .... H04L 43/0882; H04L 43/16; H04W 24/04; H04W 84/18
See application file for complete search history.

(56) References Cited

U.S. PATENT DOCUMENTS

| | | | |
|---|---|---|---|
| 10,257,724 B2 * | 4/2019 | Lewis | H04W 24/04 |
| 2003/0196138 A1 | 10/2003 | Ito | |
| 2004/0139235 A1 | 7/2004 | Rashid et al. | |
| 2005/0021409 A1 | 1/2005 | Michaud et al. | |

(Continued)

FOREIGN PATENT DOCUMENTS

| | | |
|---|---|---|
| WO | 2004012094 A1 | 2/2004 |
| WO | 2014186699 A1 | 11/2014 |
| WO | 2017/091530 A1 | 6/2017 |

OTHER PUBLICATIONS

International Search Report and Written Opinion dated Jun. 6, 2018 in corresponding International Application No. PCT/US18/22052 (11 pages. (submitted in parent U.S. Appl. No. 15/918,353).

*Primary Examiner* — Benjamin H Elliott, IV
(74) *Attorney, Agent, or Firm* — Venable LLP; Jeffri A. Kaminski (57) ABSTRACT

Systems, methods, and computer-readable storage media for providing an "always on" offline transaction collection. When networks go down, mobile devices can be used to generate a mesh network, where each device has a list of scheduled, future events which are planned to occur. When the events are performed, the mesh network verifies and/or records the event, so that duplication of the event does not take place. In this manner planned transactions can continue despite a network connection being down.

20 Claims, 6 Drawing Sheets

(56) References Cited

U.S. PATENT DOCUMENTS

| | | |
|---|---|---|
| 2008/0126213 A1 | 5/2008 | Robertson et al. |
| 2012/0233005 A1 | 9/2012 | White |
| 2014/0172783 A1 | 6/2014 | Suzuki et al. |
| 2015/0302378 A1 | 10/2015 | Richelson et al. |
| 2017/0031874 A1 | 2/2017 | Boudville |
| 2017/0046651 A1 | 2/2017 | Lin et al. |
| 2017/0103468 A1 | 4/2017 | Orsini et al. |
| 2017/0132619 A1* | 5/2017 | Miller ............... G06Q 20/3829 |
| 2017/0132621 A1 | 5/2017 | Miller et al. |
| 2017/0272317 A1 | 9/2017 | Singla et al. |
| 2018/0115538 A1* | 4/2018 | Blake ..................... H04L 63/10 |
| 2018/0176228 A1* | 6/2018 | He ........................ H04L 63/105 |
| 2018/0197156 A1* | 7/2018 | Beesley ............... H04L 47/781 |
| 2018/0262928 A1* | 9/2018 | Lewis .................. H04W 24/04 |
| 2019/0182688 A1* | 6/2019 | Lewis .................. H04W 24/04 |

* cited by examiner

SYSTEM AND METHOD FOR "ALWAYS ON" OFFLINE TRANSACTION COLLECTION

CROSS-REFERENCE TO RELATED APPLICATIONS

This application is a Continuation of U.S. patent application Ser. No. 15/918,353 filed on Mar. 12, 2018, which claims the benefit of U.S. Provisional Application No. 62/470,001, filed on Mar. 10, 2017, all of which are hereby incorporated by reference herein in their entirety.

BACKGROUND

1. Technical Field

The present disclosure relates to recording transactions when networks are down, and more specifically to recording the transactions using a mesh network.

2. Introduction

Manufacturers, retailers, distributors, and other enterprises often use computer systems to track movement of inventory, issuing of purchase orders, receiving purchase orders, and perform analyses on this information. Generally, the use of computer systems for such operations can be broken down into two categories: (1) Tracking consumer transactions (e.g., purchases conducted as consumers leave the store with products), and (2) Tracking non-financial transactions (e.g., receiving inventory, purchase orders, etc.). Such systems operate by recording the transaction on a mobile device, then transmitting the transaction information to a server over a network. However, when the network connection is broken, this system of recording transactions can no longer update the server, and the ability to record additional transactions using this system is stopped.

SUMMARY

An exemplary method for performing the concepts disclosed herein can include receiving, on a mobile device and from a server, a portion of a list of future events; determining, at the mobile device, that communication bandwidth between the mobile device and the server is below a threshold, to yield a network lost determination; generating, in response to the network lost determination, a mesh network between the mobile device and other mobile devices; receiving, at the mobile device and over the mesh network, additional portions of the list of future events; forming the list of future events using the portion of the list of future events and the additional portions of the list of future events; and recording, using the mobile device, a performance of an event in the list of future events.

An exemplary system configured to perform according to the concepts disclosed herein can include a processor and a computer-readable storage medium having instructions stored which, when executed by the processor, cause the processor to perform operations including: receiving, on a mobile device and from a server, a first portion of a list of future events; determining, at the mobile device, that communication bandwidth between the mobile device and the server is below a threshold bandwidth, to yield a network lost determination; generating, in response to the network lost determination, a mesh network between the mobile device and other mobile devices; receiving, at the mobile device and over the mesh network, a second portion of the list of future events; forming the list of future events using the first portion of the list of future events and the second portion of the list of future events, wherein the list of future events is a blockchain ledger; recording, using the mobile device, a performance of an event in the list of future events, to yield an updated list of future events; transmitting the updated list of future events to the other mobile devices for verification using a blockchain verification process; and receiving a confirmation from the other mobile devices that the performance was verified.

An exemplary non-transitory computer-readable storage medium configured as disclosed herein can have instructions stored which, when executed by a computing device, cause the computing device to perform operations including: receiving, on a mobile device and from a server, a portion of a list of future events; determining, at the mobile device, that communication bandwidth between the mobile device and the server is below a threshold, to yield a network lost determination; generating, in response to the network lost determination, a mesh network between the mobile device and other mobile devices; receiving, at the mobile device and over the mesh network, additional portions of the list of future events; forming the list of future events using the portion of the list of future events and the additional portions of the list of future events; and recording, using the mobile device, a performance of an event in the list of future events.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

To increase efficiency within a retail environment, one or more databases can be used to record transactions which occur within a store. For example, each time a customer purchases products and checks out of a store, the cash register can record the transaction, including information regarding the items sold, the amount being paid by the customer, and how the amount is being paid. The cash register can then transmit that information to a server or a database, where the data from many purchases can be compiled for additional analysis. Other examples of transactions which can be recorded include scheduled transactions which can be recorded on the mobile computing devices of the store associates (such as MC40s) rather than the store registers. Examples of such scheduled transactions include price changes on items as store associates are working, inventory verification by those store associates checking the aisles, receiving of inventory upon receiving purchase orders, and distributing pre-paid inventory associated with a purchase order. In other words, transactions which can be planned or scheduled before they occur. Under normal operating conditions, the store associates can receive a list of scheduled transactions to perform via their mobile computing device, then record the completion of these scheduled transactions on the mobile computing device at which point the mobile computing device can transmit a record of the transaction to the server or database for record keeping.

However, on occasion the network connection allowing the cash registers and/or the mobile computing devices to record this information is broken, severed, or otherwise inadequate to transmit the recorded information. In such circumstances, the ability to verify and record transactions is significantly impaired. Specifically, cash registers are unable to send and receive the encryption keys necessary to complete credit transactions, and mobile computing devices are unable to report/verify completion of scheduled tasks with the server. The lack of encryption keys can impede completion of credit or purchasing transactions for scheduled transactions because without the keys (1) ensuring duplication of the transaction does not occur is difficult and (2) verifying that the transaction is correctly performed is difficult.

The concepts disclosed herein provide a solution for performing scheduled transactions when the network connection between a server and mobile computing devices is broken, severed, or otherwise inadequate to record performance of scheduled transactions, ensure that scheduled transactions are not incorrectly duplicated, and/or otherwise verify scheduled transactions are properly performed. To accomplish this, the mobile computing devices used by store associates receive copies of a list of future events (i.e., scheduled transactions) while the network is still enabled. When the network connection breaks or is otherwise inadequate, the mobile computing devices form a mesh network amongst themselves. Store associates may then continue performing the scheduled transactions with the respective performances of those transactions verified by the other mobile computing devices within the mesh network. Thus, embodiments of the invention improve the operation of the computer system by bypassing slow or broken network connections and forming a new network to process scheduled transactions.

In certain configurations, the list of future events can be distributed to each and every mobile computing device connected to a server via a network before the network connection is severed. In other configurations, the list of future events is only delivered to select devices while the network is enabled, then distributed to the remaining devices after the network connection is severed. In addition, some configurations can utilize a partitioned list of future events, where a first device contains a first portion of the future events list while the network is enabled, a second device contains a second portion of the future events list while the network is enabled, and upon the network becoming disabled the mobile devices share their respective portions and each device forms the entire list of future events. Distributing the future events list between the mobile devices improves the efficient of the computer system as the entire future events list does not need to be distributed and updated for all of the mobile devices, which ties up network and processing availability.

The list of future events can be in a standard data format, such as SQL, or can be stored as part of a blockchain ledger. Upon a store associate performing a transaction in the list of future events, the mobile device(s) with which the store associate performed the transaction sends a notification to the other mobile computing devices forming the mesh network informing them of the transaction performance. The other mobile computing devices can then verify or deny the transaction based on the information received. This verification or denial can also be based on the data/ledger/list stored on each respective mobile device. If the transaction is approved (for example, by a threshold number of mobile devices in the mesh network), the stored list on each mobile computing device will be updated with the approved transaction. Likewise, if the transaction is not approved, a record of the unverified transaction performance can be made.

These examples and other will be described as various embodiments of the disclosure are described in detail below. While specific implementations are described, it should be understood that this is done for illustration purposes only. Other components and configurations may be used without parting from the spirit and scope of the disclosure. The disclosure now turns to the illustrated figures.

Figure 1A:
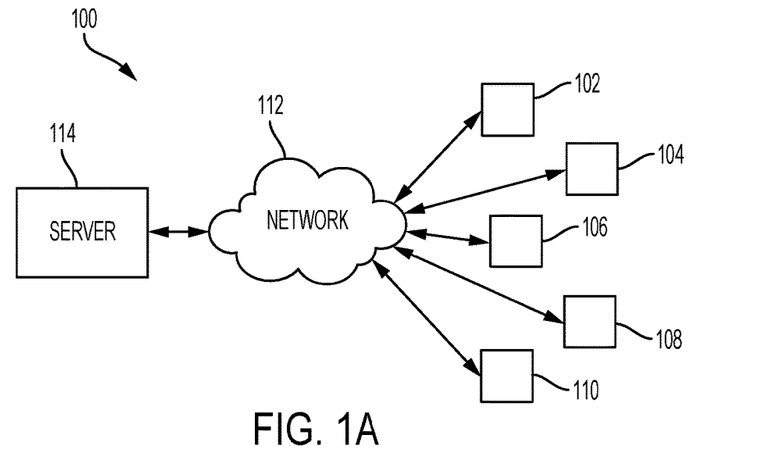
FIG. 1A illustrates an exemplary transaction recording architecture when a network is functional.

FIG. 1A illustrates an exemplary transaction recording architecture 100 when a network 112 is functional. In this example, a server 114 is collecting information related to transactions from multiple computing devices 102-110. Examples of the computing devices 102-110 include mobile computing devices such as MC40s, Telxons, or other mobile computing devices used, for example, by store associates in performing inventory maintenance and tracking in-store transactions. When a store associate using one of the computing devices 102-110 performs a transaction, data associated with that transaction is transmitted from the respective device to the server 114 across the network 112.

In addition, devices 102-110 configured according to this disclosure receive, from the server 114 via the network 112, a list of future events which are to occur. The list of future events can be, for example, a list of transactions which are scheduled to occur within a defined time period. Alternatively, the list of future events can be all events which are scheduled to occur after the current moment. Examples of scheduled events can include purchase orders for receiving trucks, other types of truck orders, or scheduled pick up orders. This list of future events is stored on the devices 102-110 so that if the network 112 goes down, the devices 102-110 can continue processing the scheduled transactions.

Figure 1B:
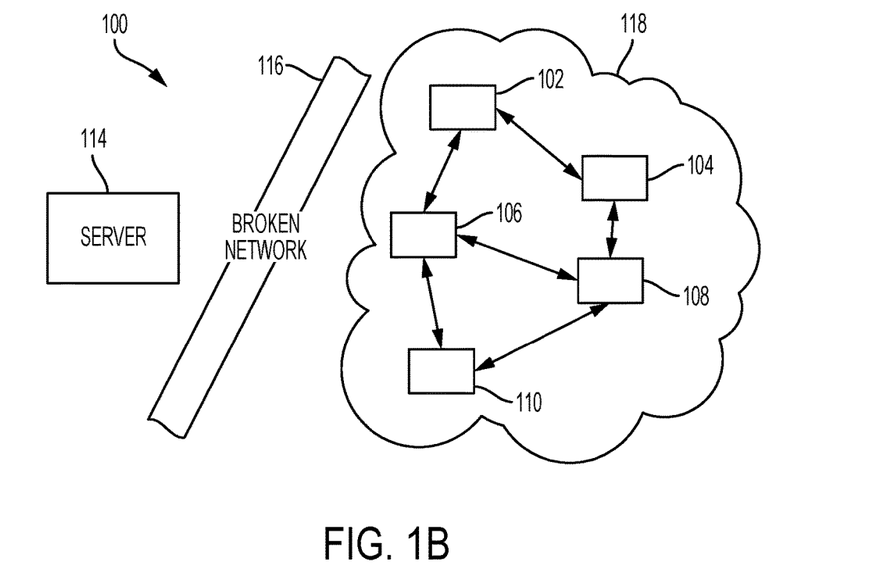
FIG. 1B illustrates an exemplary transaction recording architecture when the network is disabled.

FIG. 1B illustrates the exemplary transaction recording architecture 100 when the network 112 is disabled, illustrated as a broken network 116. A determination that the network 112 is broken can be made, for example, by comparing the data rates for communicating with the server 114 at two distinct points in time. If, from the first time to the second time, the data rate decreases a threshold amount, the network 112 may be considered broken or inadequate. If no data is being communicated, the network 112 may similarly be identified as broken 116. Yet another way of identifying the network as broken is confirming a lack of communication of multiple devices 102-110 with the server 114, rather than one device alone. Determinations regarding the adequacy of the network 112 can further be based on meeting threshold bandwidths or data communication rates.

In this example, the server 114 has become isolated from the mobile computing devices 102-110 because of the broken network 116. The mobile computing devices 102-110 have, upon determining that the network is broken 116, formed a mesh network 118, where each mobile computing device 102-110 is a node within the mesh network 118. The mesh network 118 is formed, for example, using WiFi, RF, or other electromagnetic signaling. In some mesh networks 118, each node 102-110 communicates with each and every other node within the mesh network 118. In other configurations, such as the mesh network 118 illustrated, not every node is in contact with all of the remaining nodes. Instead, some nodes, such as mobile computing device 106, act as a relay for communications between nodes 102 and 110.

When store associates perform scheduled transactions which are on the list of future events, the device can record the performance and transmit completion of the event to the remaining devices in the mesh network 118, such that the other devices record that event as completed. In other configurations, the device with which the transaction is performed can send a notification to the other nodes within the mesh network 118 requesting verification that the transaction performance was correctly performed. This verification can also ensure that the transaction had not been previously performed by one of the other mobile computing devices within the mesh network 118.

Figure 2:
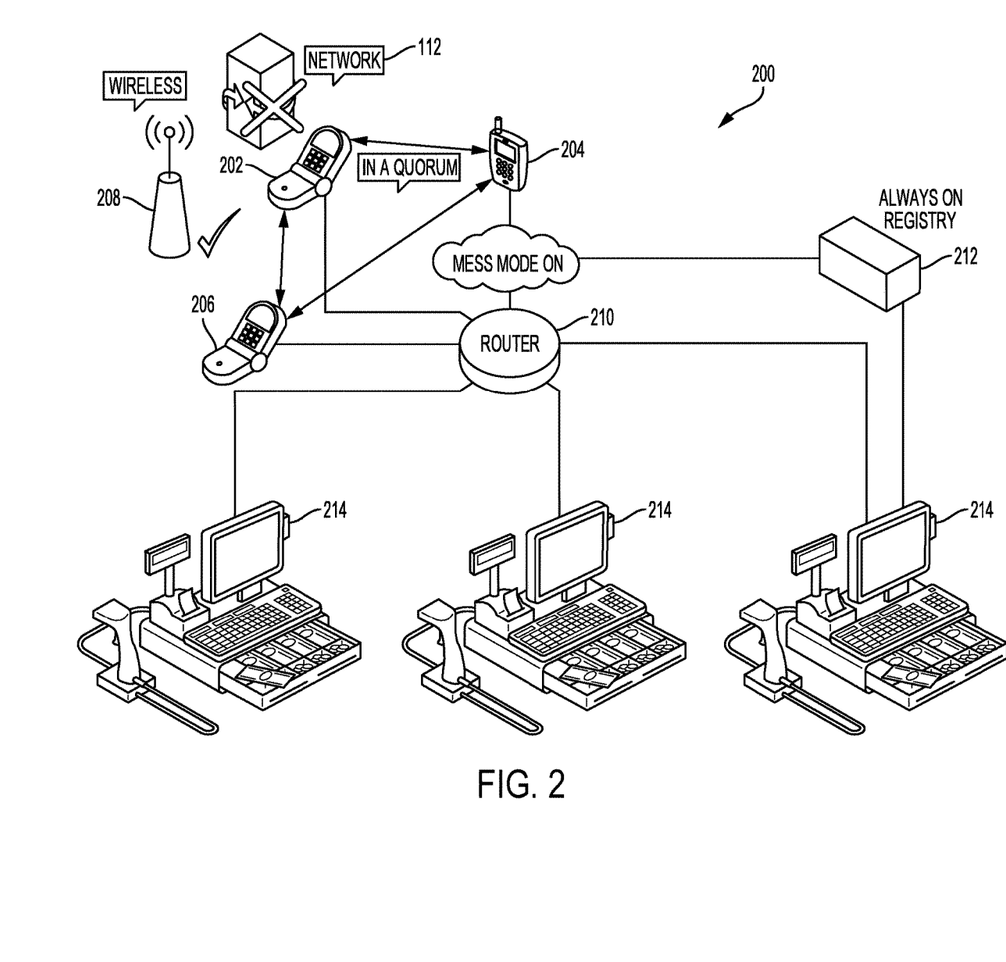
FIG. 2 illustrates a second exemplary transaction recording architecture when the network is disabled.

FIG. 2 illustrates a second exemplary transaction recording architecture 200 when the network 112 is disabled. In this example, store registers 214 are connected to a router 210, which distributes data between the registers 214 and mobile computing devices 202-206 with the assistance of a wireless communications access point 208. In communication with the router 210 is an "Always on registry" 212, which can track the list of scheduled events to occur and/or the events performed by devices when the network 112 is broken.

In the illustrated architecture 200, the connection to the network 112 is down, but the ability to communicate via WiFi within the store via the wireless terminal 208 is still enabled. This allows the mobile computing devices 202-206 to form a wireless network using the router 210 to relay communications between the respective mobile computing devices 202-206. Because the illustrated architecture 200 relies on communications between the mobile devices 202-206 being relayed through the wireless access point 208 and the router 210, the network formed by the mobile devices 202-206 is not a mesh network. Nevertheless, the mobile devices 202-206 can operate, in a network 112 down situation, as the mobile devices of the mesh network 118 illustrated in FIG. 1B. Namely, the mobile devices 202-206 of FIG. 2 can exchange communications between one another to verify the performance of transactions and complete actions listed on a list of future events.

In certain configurations, the confirmation and/or recording of the transaction performances during the network 112 situation can occur using the "always on" registry 212. In such configurations, the individual mobile device performing the transaction would record the transaction as complete, transmit information associated with the transaction to the always on registry, which would in turn distribute updated lists of future events to the other mobile devices 202-206 operating on the wireless access point 208.

In other configurations, despite having the wireless access point 208, the mobile devices 202-206 still form a mesh network. To form the mesh network, a threshold number of devices must be present, thereby forming a quorum. As an example, some configurations may require at least three mobile devices to form the mesh network. The purpose of the minimum number of mobile devices can be to ensure that enough mobile devices have verified the transactions as authentic that the system can be assured the verifications are authentic. A messenger mode can then be activated, allowing the router 210 and/or the always on registry 212 to receive the determinations of the mesh networked mobile devices 202-206.

In some configurations, the ability to perform financial transactions (such as processing a customer checking out with a credit card, and therefore needing encryption keys sent over the network) is disabled. In such configurations, the registers 214 would not be part of the mesh network. However, in other configurations, the registers 214 can be equipped to receive and process transactions listed on the list of future events. For example, if a customer has already placed (and paid for) an order, that customer can come to the store, obtain the order, and check out using a register 214. The register 214 would then transmit the performance of the transaction to the other devices 202-206, the router 210, the always on registry 212, and/or the other registers 214. The communications to/from the registers in such configurations can occur wirelessly or via wired connections (if power to the router 210 is still available).

The list of future events distributed to the computing devices can be provided in its entirety to each device 202-206 and/or register 214 while the network is still active, or the list can be partitioned among the devices. Partitioning the list can, for example, save bandwidth by reducing the amount of data that needs to be communicated while the network is active. When the network becomes broken and the mesh network 118 is formed, the partitioned list components can be distributed to each of the other devices in the mesh network 118, allowing each device to form the full list of future events. In other configurations, each device can retain only the portion of the partitioned list originally distributed to it, but can distribute instructions to the remaining devices informing them where that portion of the list can be found.

Figure 3A:
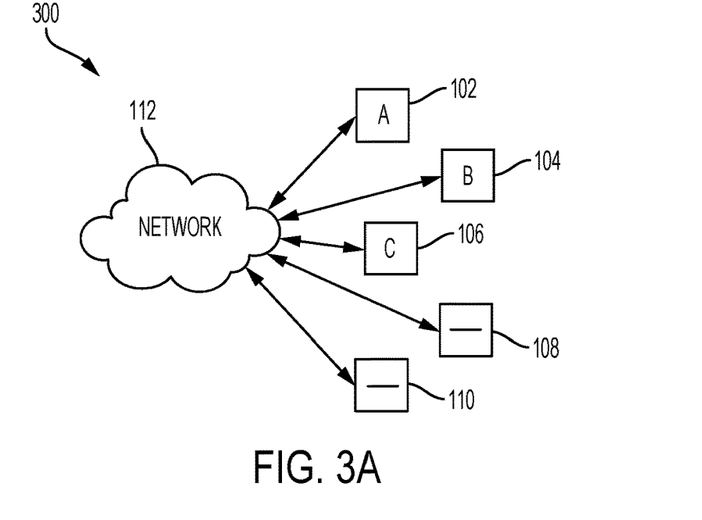
FIG. 3A illustrates an example of a partitioned list of future events distributed to mobile devices when the network is functional.

FIG. 3A illustrates an example 300 of a partitioned list of future events distributed to mobile devices 102-106 when the network 112 is functional. In this example 300, some of the mobile computing devices 102-106 have received, across the network, portions of a list of future events, designated "A", "B", and "C." Other mobile computing devices 108, 110 have not received portions of the list of future events.

Figure 3B:
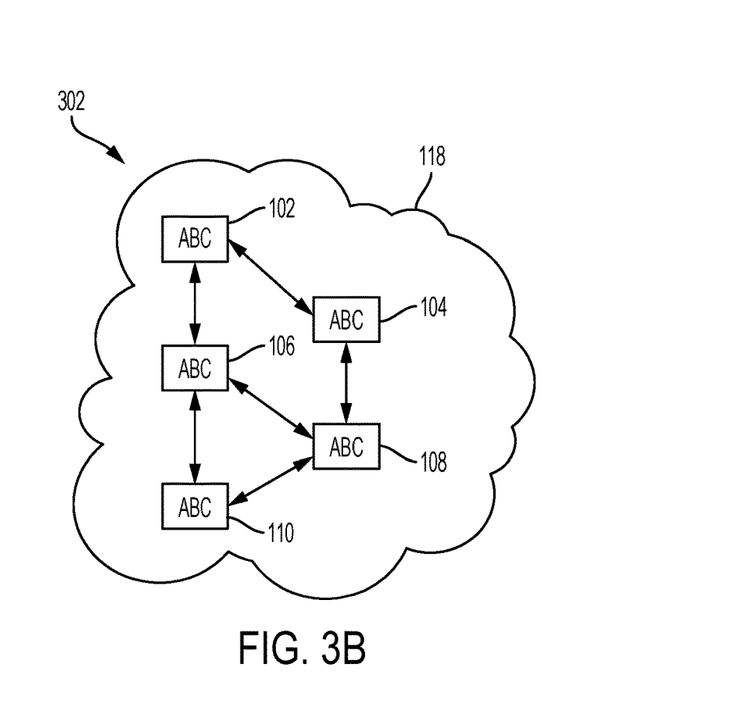
FIG. 3B illustrates an example of the partitioned list of future events redistributed to each mobile device when the network is not functional.

FIG. 3B illustrates an example 302 of the partitioned list of future events redistributed to each mobile device 102-110 when the network 112 is not functional. In this example 302, when the network 112 is determined to be broken, severed, or otherwise insufficient to send and/or receive data, the mobile devices 102-110 form the mesh network 118. In addition, those nodes 102-106 which had previously received a portion of the partitioned list of future events distribute their portion to the remaining nodes, such that each node 102-110 in the mesh network 118 has the complete list of future events ("ABC").

Figure 4:
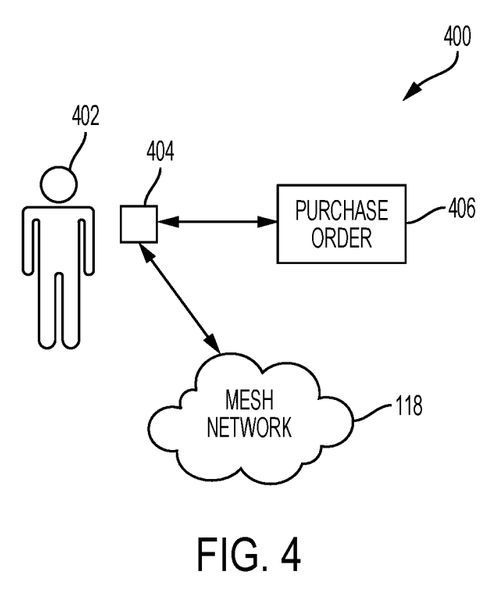
FIG. 4 illustrates a store associate using a mobile device to verify a transaction using a mesh network.

FIG. 4 illustrates an example 400 of a store associate 402 using a mobile device 404 to verify a transaction 406 using a mesh network 118. In this example 400, the store associate uses a mobile computing device 404 such as a MC40 to record a transaction, such as the receiving of a purchase order 406. When the mobile computing device 404 records the transaction, it can then transmit data associated with the performing of the transaction to the mesh network 118. This transmission of data can be for the purpose of updating the remaining nodes within the mesh network 118 that the transaction was performed, can be for the purpose of verifying that the transaction had not been previously performed, or can be for other verification purposes.

Figure 5:
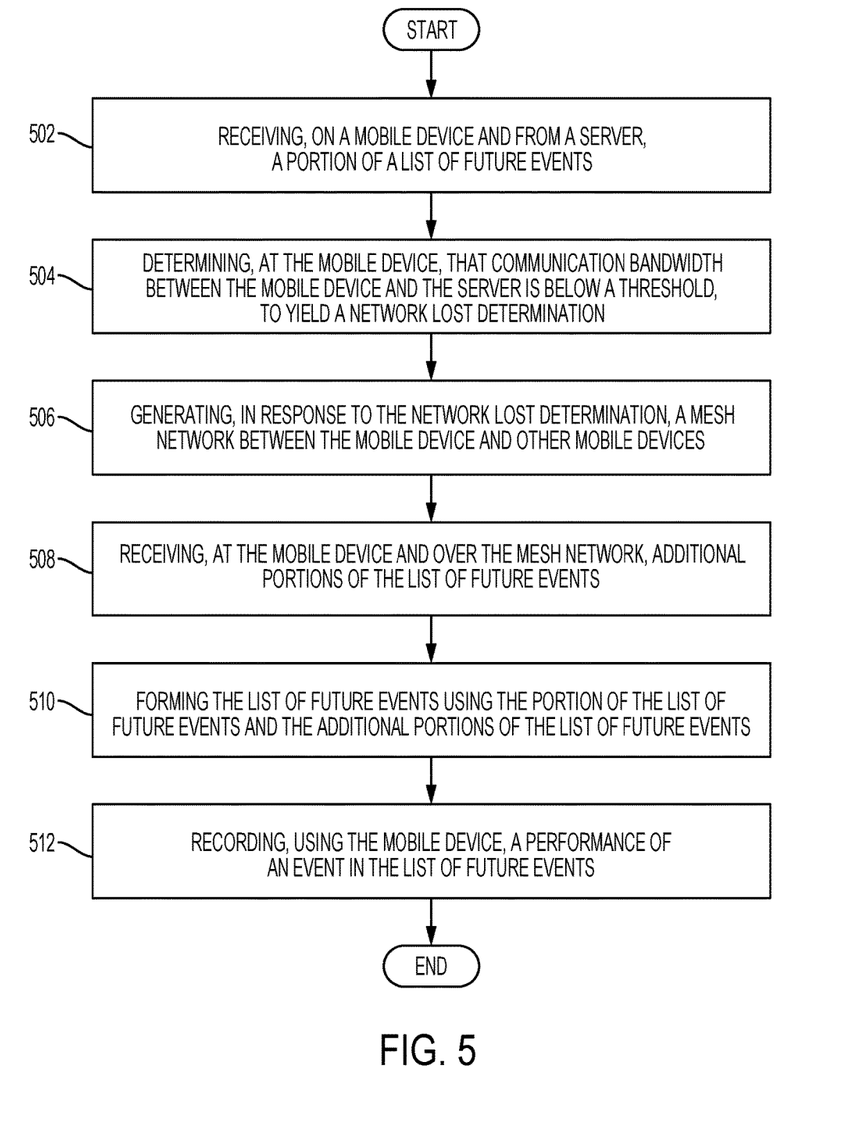
FIG. 5 illustrates an example method embodiment.

FIG. 5 illustrates an example method embodiment. This example, which is performed by a mobile device 102 in the mesh network 118, can also be performed by other types of devices (which may or may not be mobile). In this example, the mobile device 102 receives, from a server 114, a portion of a list of future events (502). The mobile device 102 determines that communication bandwidth between the mobile device 102 and the server 114 is below a threshold, to yield a network lost determination (504). In response to the network lost determination, the mobile device 102 generates a mesh network 118 between the mobile device 102 and other mobile devices 104-110 (506). The mobile device 102 receives, over the mesh network 118, additional portions of the list of future events (508). The mobile device 102 forms the list of future events using the portion of the list of future events and the additional portions of the list of future events (510), and records a performance of an event in the list of future events (512).

When the network 112 is reconnected with the mobile device 102, the server 114 can receive, from the mobile device 102 and/or the other devices in the mesh network 118, a list of the transactions performed while the network 112 was down. The server 114 can then merge the list of recorded transactions made while the network 112 was down with the "master" list maintained by the server 114, and reissue a new list of future events to the mobile devices 102-110 based on that merger.

In other configurations, the method of FIG. 5 can be expanded to include updating the list of future events based on the performance, to yield an updated list of future events, and transmitting the updated list of future events via the mesh network to at least one other mobile device in the other mobile devices. Still other configurations can transmit a first portion of the updated list of future events to at least one other mobile device in the other mobile device, and not transmitting a second portion of the updated list of future events to the at least one other mobile device. Systems configured according to this disclosure can also receive, from another mobile device in the mobile devices of the mesh network, a notification that the other mobile device performed an action associated with an event in the list of future events; and verify the notification using the list of future events on the mobile device.

The list of future events, and the information associated with the performed transaction, can be stored in a normal database format (such as SQL), or can be stored in a blockchain format as a blockchain ledger. A blockchain ledger used with the disclosed systems can be generated by the server 114 at periodic intervals (i.e., every morning at 5 am) and contain within it a list of all known events which are to occur that day. This blockchain ledger can then be distributed to the mobile devices 101-110 in case of network disruption. When a transaction is performed, the device which performs the transaction can initiate a blockchain verification using the blockchain ledger, wherein the blockchain verification is performed by multiple mobile devices in the other mobile devices 104-110. For example, the blockchain verification may require a threshold number of devices (or a threshold percentage of the other devices, such as 50% or 60% of the other devices) within the other mobile devices 104-110 of the mesh network 118 to approve the performance of the event before the blockchain ledger with a record of the performance is approved.

Figure 6:
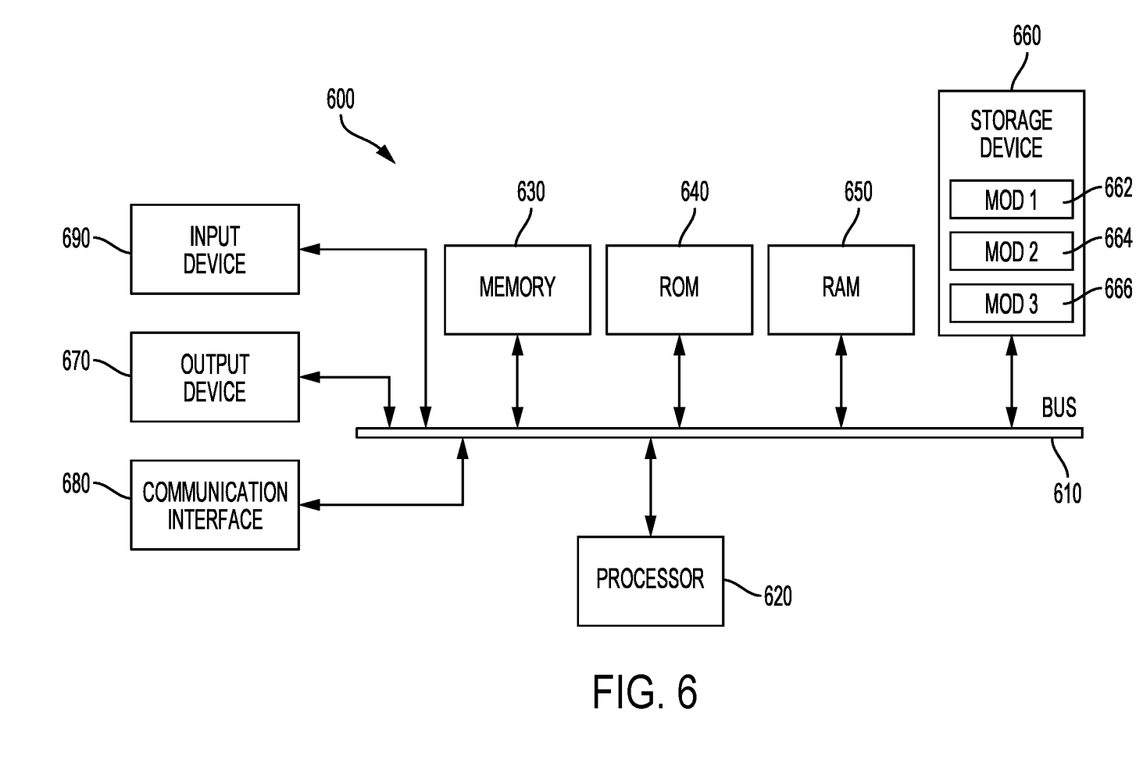
FIG. 6 illustrates an exemplary computer system.

With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache 622 of high speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    determining, at a mobile device, that communication bandwidth between the mobile device and a server is below a bandwidth threshold, to yield a network lost determination;
    while the communication bandwidth is below the bandwidth threshold:
        generating, in response to the network lost determination, a mesh network between the mobile device and other mobile devices; and
        recording, using the mobile device, a performance of an event while the communication bandwidth is below the bandwidth threshold; and
    upon the communication bandwidth being restored to at least the bandwidth threshold:
        transmitting the performance of the event from the mobile device to the server.

2. The method of claim 1, further comprising verifying the performance of the event against a list of scheduled events.

3. The method of claim 2, wherein the verifying of the performance of the event requires approval by a threshold number of the mobile devices in the mesh network.

4. The method of claim 2, further comprising:
    generating an updated list of scheduled events based on the verifying of the performance of the event; and
    transmitting a first portion of the updated list of scheduled events to at least one other mobile device in the other mobile devices, and not transmitting a second portion of the updated list of scheduled events to the at least one other mobile device.

5. The method of claim 2, wherein the list of scheduled events is a blockchain ledger.

6. The method of claim 5, further comprising initiating a blockchain verification using the blockchain ledger, wherein the blockchain verification is performed by multiple mobile devices in the other mobile devices.

7. The method of claim 1, further comprising:
    receiving, from an other mobile device in the mobile devices of the mesh network, a notification that the other mobile device performed an action associated with another event; and
    verifying the notification on the mobile device.

8. A system comprising:
    a processor; and
    a computer-readable storage medium having instructions stored which, when executed by the processor, cause the processor to perform operations comprising:
        determining, at a mobile device, that communication bandwidth between the mobile device and a server is below a bandwidth threshold, to yield a network lost determination;
        while the communication bandwidth is below the bandwidth threshold:
            generating, in response to the network lost determination, a mesh network between the mobile device and other mobile devices; and
            recording, using the mobile device, a performance of an event while the communication bandwidth is below the bandwidth threshold; and
        upon the communication bandwidth being restored to at least the bandwidth threshold:
            transmitting the performance of the event from the mobile device to the server.

9. The system of claim 8, the computer-readable storage medium having additional instructions stored which, when executed by the processor, cause the processor to perform operations comprising verifying the performance of the event against a list of scheduled events.

10. The system of claim 9, wherein the verifying of the performance of the event requires approval by a threshold number of the mobile devices in the mesh network.

11. The system of claim 9, the computer-readable storage medium having additional instructions stored which, when executed by the processor, cause the processor to perform operations comprising:
    generating an updated list of scheduled events based on the verifying of the performance of the event; and
    transmitting a first portion of the updated list of scheduled events to at least one other mobile device in the other mobile devices, and not transmitting a second portion of the updated list of scheduled events to the at least one other mobile device.

12. The system of claim 9, wherein the list of scheduled events is a blockchain ledger.

13. The system of claim 12, the computer-readable storage medium having additional instructions stored which, when executed by the processor, cause the processor to perform operations comprising initiating a blockchain verification using the blockchain ledger, wherein the blockchain verification is performed by multiple mobile devices in the other mobile devices.

14. The system of claim 8, the computer-readable storage medium having additional instructions stored which, when executed by the processor, cause the processor to perform operations comprising:
    receiving, from an other mobile device in the mobile devices of the mesh network, a notification that the other mobile device performed an action associated with another event; and
    verifying the notification on the mobile device.

15. A non-transitory computer-readable storage medium having instructions stored which, when executed by a computing device, cause the computing device to perform operations comprising:

determining, at a mobile device, that communication bandwidth between the mobile device and a server is below a bandwidth threshold, to yield a network lost determination;

while the communication bandwidth is below the bandwidth threshold:

generating, in response to the network lost determination, a mesh network between the mobile device and other mobile devices; and recording, using the mobile device, a performance of an event while the communication bandwidth is below the bandwidth threshold; and upon the communication bandwidth being restored to at least the bandwidth threshold:

transmitting the performance of the event from the mobile device to the server.

16. The non-transitory computer-readable storage medium of claim 15, having additional instructions stored which, when executed by the computing device, cause the computing device to perform operations comprising verifying the performance of the event against a list of scheduled events.

17. The non-transitory computer-readable storage medium of claim 16, wherein the verifying of the performance of the event requires approval by a threshold number of the mobile devices in the mesh network.

18. The non-transitory computer-readable storage medium of claim 16, having additional instructions stored which, when executed by the computing device, cause the computing device to perform operations comprising:

generating an updated list of scheduled events based on the verifying of the performance of the event; and transmitting a first portion of the updated list of scheduled events to at least one other mobile device in the other mobile devices, and not transmitting a second portion of the updated list of scheduled events to the at least one other mobile device.

19. The non-transitory computer-readable storage medium of claim 16, wherein the list of scheduled events is a blockchain ledger.

20. The non-transitory computer-readable storage medium of claim 19, having additional instructions stored which, when executed by the computing device, cause the computing device to perform operations comprising initiating a blockchain verification using the blockchain ledger, wherein the blockchain verification is performed by multiple mobile devices in the other mobile devices.

* * * * *